Nov. 1, 1932.  S. N. BUCHANAN  1,885,227
GROUNDING DEVICE
Filed Nov. 15, 1927   2 Sheets-Sheet 1
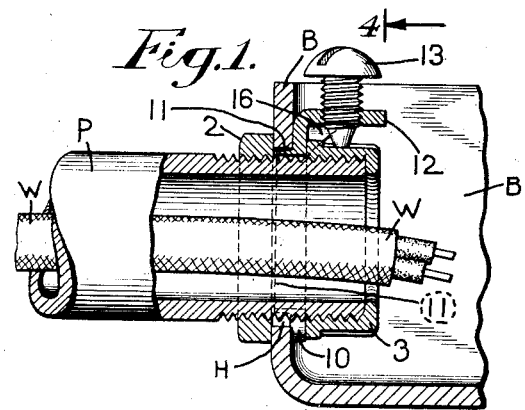
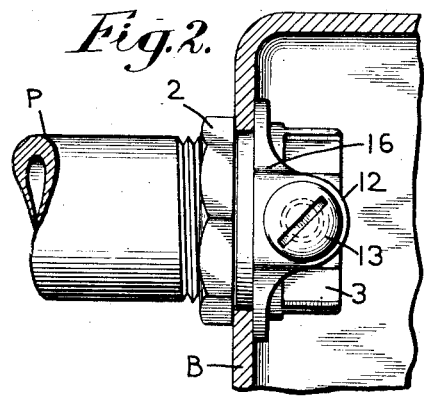
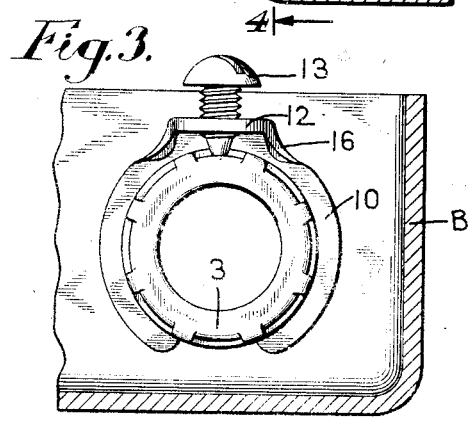
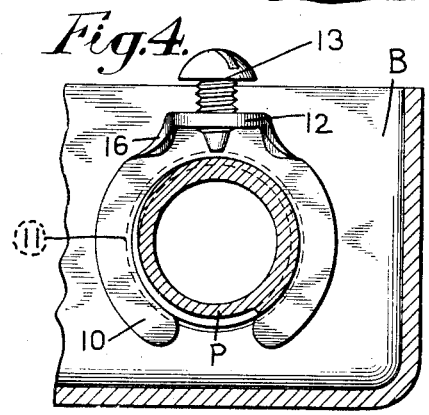
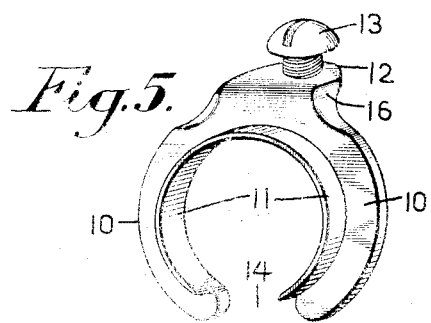
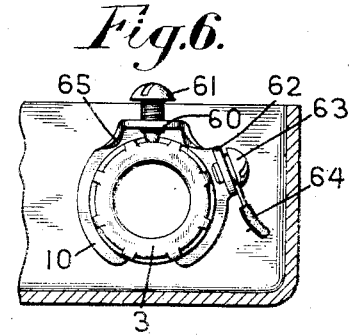
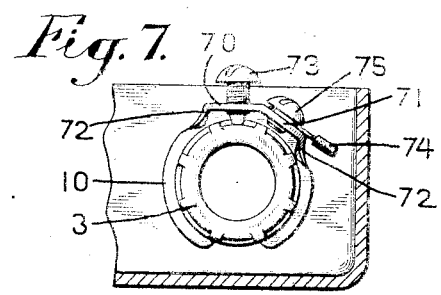
Inventor
STEPHEN N. BUCHANAN
By his Attorneys Nov. 1, 1932.     S. N. BUCHANAN     1,885,227
GROUNDING DEVICE
Filed Nov. 15, 1927     2 Sheets-Sheet 2
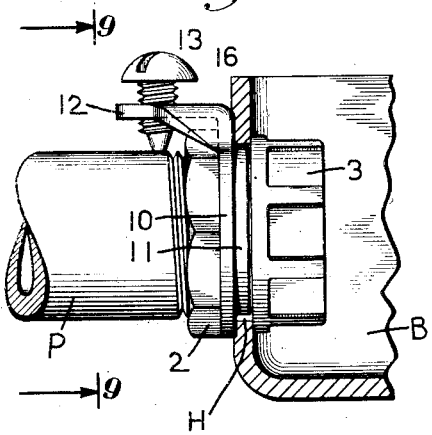
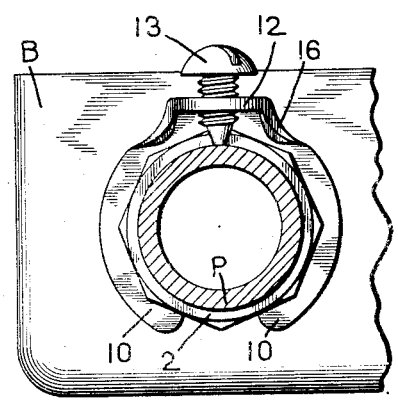
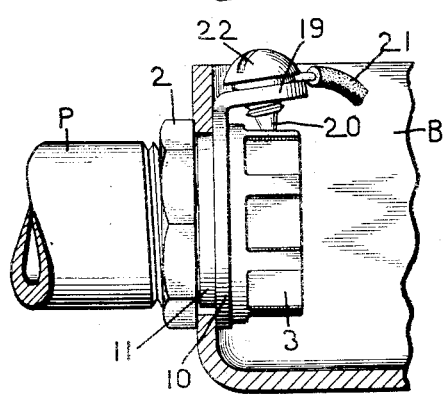
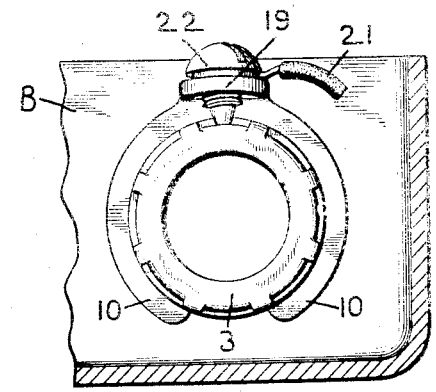
Inventor
STEPHEN N. BUCHANAN
By his Attorneys
Bohleber & Ledbetter Patented Nov. 1, 1932

1,885,227

UNITED STATES PATENT OFFICE

STEPHEN N. BUCHANAN, OF NEW YORK, N. Y., ASSIGNOR TO THE THOMAS & BETTS CO., OF ELIZABETH, NEW JERSEY, A CORPORATION OF NEW JERSEY

GROUNDING DEVICE

Application filed November 15, 1927. Serial No. 233,394.

This invention relates to electrical connecting means and more particularly to a grounding device for use in connection with wiring installations in houses, in buildings and the like, to ground the wiring system and eliminate fire hazards.

An object of the invention is to produce a grounding device for convenient use in connection with outlet box and conduit or cable installations to establish positive electrical connection between the box and conduit received thereinto; and it is also an object to produce a grounding device to which an extra ground wire may be conveniently attached and run through various connections to the ground so as to ground safely the box assembly and wiring systems and eliminate all fire hazard.

A further object is to produce an electrical grounding device which may be used in old box and house work and old wiring installations without removing or disconnecting the wires, and in this way, old electrical house work, as well as new, may be tightened up and reconditioned to establish positive electrical ground connection between a conduit and box.

A further object of the invention is to produce a grounding device which may be quickly installed either inside or outside a box and on the conduit received into the box and which makes electrical contact with the box and conduit. Operating means, such as a screw, is carried on the device to quickly tighten and seat it against the box and pipe to effect positive electrical connection between all parts. In some forms of the construction and its modes of use, the operating screw means also locks a nut ordinarily carried on a conduit so that the nut or nuts cannot become loosened by vibration of the structure in which the box and conduit work is carried.

A further object of the invention is to produce several forms of the grounding device whereby one form may be availed of to attach an extra electrical ground wire to a box, this extra wire being carried through various connections to the ground; and another form is used without the extra ground wire, this latter construction being used to make positive electrical ground connection between the pipe and outlet box. Both forms of the invention are well suited to the various requirements which arises, and each form is capable of variations in design and construction.

A further object is to produce a grounding device which adapts itself to either or both of two operating means which are present in the box assembly and device. I refer generally to the several operating means as the instrumentalities which tighten the device and anchor it in position, one of these means being a screw carried on the grounding device itself, and the other being the nut or nuts which ordinarily anchor the pipe in the box hole. Either the screw or the nuts or both together, act on the grounding device to render it effective and force it into electrical contact with the box and pipe and simultaneously anchor all parts together. When either or both anchorage or operating means, i. e. the screws or nuts, are actuated or turned, it follows that bonding or electrical connection is made requisite which is to say that the use of my invention with a conduit or box connecting means establishes a good bond between the box and conduit, and this bonding is made requisite when the means used for connecting the conduit to a box is actuated or tightened.

It is also an object to produce a grounding device including pipe engaging means to make electrical contact with the pipe and including box hole edge engaging means which reaches into a box hole and bears against the exposed edge or rim of the box hole, to make electrical contact with the box. The device is anchored in position by one or both of the above mentioned screw operating means in such a way that the pipe engaging means and the box hole edge engaging means simultaneously become effective to close on and grip against the pipe and seat itself into binding engagement with the box hole edge.

Inasmuch as the principle of the invention affords a basis for numerous constructions adapted to as many different uses, I have selected several examples for disclosure in the accompanying drawings wherein;

Figure 1 shows a longitudinal section of an outlet box, a conduit, and electrical wire assembly with the grounding device used in connection therewith; and Figure 2 shows a plan view thereof.

Figure 3 is an inside box view showing the conduit in end elevation; and Figure 4 is an inside box view, being a section on the line 4—4 of Figure 1. The first four views show how the grounding device is installed inside the box.

Figure 5 is a perspective view of the grounding device apart from the box assembly.

Figures 6 and 7 show modified forms of the grounding device, the first view showing two spaced ears, one of which carries an operating screw and the other carries a wire clamp screw; while the latter view illustrates one integral ear structure or down turned flange adapted to carry both of the screws. These two views illustrate different examples of plural screw mounting means.

Figures 8 and 9 illustrate that form of the grounding device shown in the first five views and as mounted on the outside of the box, the first view being a longitudinal box section, while the conduit, the fittings and the grounding device are in elevation; and the latter view shows an outside box section on the line 9—9.

Figures 10 and 11 illustrate a modified form, the grounding device carrying a single screw to perform several purposes, as for example, to grip the device around a pipe, to bind it in a box hole, to clamp an extra electrical ground wire thereto, and to lock a bushing nut against accidental unscrewing sometimes caused by vibration and loosening of the parts aided by rust and deterioration. The first view is a longitudinal box section, and the latter is an inside box view looking toward the pipe and bushing end.

Referring now more particularly to the drawings for a further description of the invention, it will be first explained that the grounding device is capable of general use with outlet wiring boxes B which receive conduits or pipes P into the knockout outlet or box hole H. Various forms of fastening or operating means or anchorage members are employed to anchor the pipe P in the box outlet H, but the means here shown for that purpose comprises nuts 2 and 3, one of which is placed on each side of the box wall B, and in this way the box wall is clamped between the two nuts and the pipe anchored in the box hole. Tightening the nuts 2 and 3 makes it requisite that bonding or electrical ground connection occur. This type of outlet box assembly without the use of grounding devices, has long since been resorted to with the result that many electrical installations now require reconditioning because they have deteriorated and loosened up so that the box and pipe are not electrically connected and a fire hazard therefore exists. The box assembly ordinarily includes an electrical cable or wire W running through the pipe P into the box B where the bare ends of the wire are connected with other wires for completing the electrical fixture work, or the like, not shown.

Unless a good electrical ground connection exists between the pipe P and box B, there is danger of fire caused by arcing or sparking between the poorly contacted loosely attached parts and especially where rust has eaten away a portion of the box wall and fittings. In some instances it is required that this faulty box and pipe installation be reconditioned as by general replacement of parts or by other approved means, and this requirement has often led to a considerable amount of work. For example, it is sometimes necessary to disconnect the wire or wires W from other wires, not shown, so as to enable the mechanic on the job to place some form of grounding device over the wires and on the pipe and against the box wall, whereupon the nut 3 is replaced on the pipe and screwed up tightly to clamp the device into electrical engagement with the box and pipe, thus repairing and removing the fire hazard from old wiring installations. This repair of old house work is rendered difficult because of the necessity of disconnecting the wires, but my invention overcomes this inconvenience as will be explained.

By using my invention, it is not necessary to disconnect the wires W from the other lead wires or unsolder the wires in the box B because I have devised a grounding device which may be slipped into position over the wire W by merely unscrewing the nut 3 from the pipe P and leaving it hang on the wire W until the grounding device is set in position, whereupon the nut is replaced. Likewise, the grounding device is convenient to install in new house work since the device may just as readily be mounted on the pipe after the wires W are installed and connected as before they are placed in final position.

Having described one typical box assembly which is capable of being quickly reconditioned at small expense by the use of my invention, I will again refer to the pipe anchorage means comprising the bushing nut 3 and lock nut 2 which is ordinarily used to fix the pipe in the box, but which I also use with my invention as one of the operating means to clamp the grounding device in effective position to reestablish electrical connection between the box and pipe as will later be explained. This pipe anchorage means 2—3 therefore possesses this additional function as operating means to render effective the grounding device and to make bonding requisite and is therefore put to double use.

Reference is now made to Figure 5 for a description of the general construction of one example of the grounding device. I form a ring, preferably a segmental ring, by removing a portion thereof so the grounding device may be passed or slipped over the wires W after the bushing nut 3 is unscrewed from the pipe end and left hanging freely on the wires, the nut 3 being replaced on the pipe after the grounding device is set in place. The segmental ring includes a flange or edgewise ring 10 integrally carrying a box contacting wedge-shaped means, sleeve, web, or cuff portion, expanding or binding means having an outer inclined surface 11 adapted to fit into, seat within, and cover over the exposed box hole edge H, this portion 11 being formed on the inner periphery of the ring 10. The ring-like segment 10 is set edgewise to the axis thereof and is formed of thin sheet metal.

The longitudinal dimension of the box hole engaging sleeve portion 11 may be made in any suitable length to project a suitable distance from the ring-flange 10. For example it may be shorter than or about equal in length to the thickness of the box wall so as to not jam or collapse the portion 11 at its outer edge when the lock nut 2 is run up against the box wall. However, I am not limited to this construction since indeed I may prefer to otherwise form and make the sleeve part 11 effectively of any other suitable length. This grounding device 10—11 is integrally formed with an ear 12 through which an operating screw 13 is threaded and directed toward the pipe to render the device effective by applying thereto a force transversely to the pipe axis. The ear is spaced far enough away from the nut 3 so that no interference exists.

The segmental ring 10—11 is provided with the large gap or opening 14 formed opposite the ear 12 by removing a section or segment from the ring, this gap 14 being made for the reception of the wire or wires W into the ring. This construction permits the grounding device to be installed at any time on the conduit within the box, either before or after the wires W are finally connected to other wires not shown. The grounding device is preferably made of a material which will effect positive electrical connection with any part of which it is mounted. The two rings 10 and 11 are formed, in cross section, substantially at right angles to each other which provides a rigid construction since one ring portion acts to brace the other. The outer extremity of each arm 10—11 extends and curves away from the screw mounting means 12 and is designed to embrace the pipe P and exert a considerable gripping pressure against the pipe, which is due to the reaction of the operating screw 13 which is run down tightly against the pipe P or bushing nut 3, as shown in several views.

The thickness of the box contacting sleeve or web 11 is sometimes made thinner at its outer free edge than at the edge adjoining the flange 10 and hence is wedge-shaped. This outer thin edge facilitates entry of the ring into the box hole H and around the pipe and enables the grounding device to be mounted within a small clearance space. The portion 11, being relatively thin, finds ready entry into the box hole annular clearance space around the pipe because the box knockout hole H is usually a little larger than the cable or conduit received therein. Furthermore, the sharp outer edge of the contact sleeve 11 wedges into the box hole under force of the anchorage and operating nuts 2 and 3 which force the grounding portion 11 into tight binding or expanding engagement with the rim or exposed edge of the box hole. Furthermore the body or segment 10 is made of thin sheet metal set edgewise and occupies little space between the nut and box.

The grounding device shown in Figure 5 is an example of one form of construction chosen to illustrate the principles of the invention, and it is obvious that variations in design may be resorted to without departing from the principles involved. In fact, the several other box assembly views hereinafter described show various designs and adaptations and a variety of ways, inside and outside the box, in which the device may be mounted and used.

In some forms of the invention, I preferably and integrally form a reinforcement rib or corner 16 with the ring-like member 10—11 and ear 12 to brace the latter in rigid relation substantially at right angles to the ring. The rib 16 extends from each side of the ear 12 back to the flange 10 and acts to rigidly support the ear 12 in outstanding rigid relation with the ring 10—11, the box hole engaging sleeve 11 being on one side of the flange 10 and the ear 12 being on the other side. It follows that the pressure exerted by the screw 13 against the pipe P or nut 3 will not bend the ear 12 upwardly or out of shape. I have so formed the ear and rib structure 12–16 that the rib 16 stands substantially parallel to the axis of the pipe P regardless of the considerable pressure exerted by the screw 13 so the screw reacts to draw the outer free ends of the arm portions 10—11 upwardly towards the screw head to correspondingly lift and force the pipe P towards the screw. It is understood, of course, that the contact sleeve 11 is placed within and is embraced by the box hole H, thereby causing the sleeve portion to bind against the exposed rim of the box hole edge under the action of the screw 13. The screw 13 also locks the bushing nut 3 and grounding device together on the pipe, and the assembly is completed by tightening up the lock nut 2 which locks all parts together against turning or loosening action and the segmental sleeve 11 is wedged in the box hole about the pipe.

Reference is next made to the several ways in which the anchorage device may be used. Take, for example, Figures 8 and 9, where it is shown how the grounding ring may be mounted on the outside of the box to embrace the pipe P with the contact sleeve 11 placed in the box hole as usual. The grounding device is simply reversed from the position illustrated in the first views, the screw 13 is tightened down against the pipe, the bushing 3 and lock nut 2 are tightened to jam up against the flange 11 and all parts are anchored in final position and the grounding ring has established electrical connection between the box and pipe. Here the reinforcement rib 16 is ordinarily employed since it may be desired to brace the ear 12 parallel with the pipe P so that all the force exerted by the screw 13 against the pipe is utilized to laterally displace the circular arms 10—11 to draw them about the pipe and bind the wedge sleeve 11 within the box hole H to effect electrical ground connection. Furthermore the screw 13 locks the ground device against accidental turning on the pipe P. Since the ring-flange 10 may be made of brass or other suitable material, the lock nut 2 compresses against it and a permanent anchorage is effected.

In that form of the invention shown in Figures 10 and 11, I have omitted the reinforcement rib 16 so as to permit the screw carrying ear 19 to bend slightly upwardly away from the pipe and nut 3 during impingement of the screw shank 20 against the bushing nut 3 or other stationary part. An extra ground wire 21 is placed under the screw head 22 and is clamped against the ear 19. In order to permit effective pressure of the screw end 20 against the nut 3 and simultaneously effect pressure of the screw head 22 against the wire 21, I preferably omit the reinforcement rib 16 so that the ear 19 may bend slightly to compensate for the pressure and travel effected by the screw head 22 and screw end 21 which seats both portions of this screw against the pipe and wire 21, the ear 19 bending on the ring 10—11 for this purpose. This ground wire 21 is frequently required in special wiring jobs and my invention provides a ready means for attaching it to a box which renders safe the wiring system interconnected with the box B.

It is observed that in Figures 10 and 11 the design of the grounding device is such that a single ear 19 and a single screw 20 are effective to clamp the wire 21 and nut 3 which makes for a simple construction including a relatively small amount of material and thus by tightening one screw only, the work is completed. However, in some forms of the invention, as for example in Figures 6 and 7, I may desire to modify the structure of the grounding device and alter somewhat the formation of the screw and wire mounting ear 19 as will now be described.

Note, for example, in Figure 6 where I have devised a grounding device employing two screws and two ears. There is shown one ear 60 adapted to carry a screw 61 which reacts against the nut 3 to bind the ring about the pipe and in the box hole H to establish positive electrical connection between all parts. In this form, there is also provided another ear 62 carrying a wire clamp screw 63 adapted to grip a ground wire 64. One or both ears 60 and 62 may be reinforced at 65 if desired to give strength and enforce a powerful lateral binding action of the ring about the pipe when the screw 61 is tightened. The ground wire 64 is placed under the screw 63 and clamped thereunder at any stage of the work. In this way, the pipe gripping arm portions 10 and 11 bind and grip, respectively, within the box hole and about the pipe quite independently of any function to be performed by the grounding wire clamp screw 63.

Coming to Figure 7, there is shown an ear structure on the grounding device, which is in a way similar to that of Figure 6, except that the two ears 60 and 62 of Figure 6, are made in one ear 70—71 in Figure 7. Here, the reinforcement ribs 72 are integrally formed between the double ear 70—71 and the ring flange 10. The ear 70—71 is formed in one integral flanged structure to impart rigidity, especially so when reinforced by the ribs 72. In this way, the reaction against the pipe or nut of an operating screw 73 does not result in unduly bending the double rib 70—71 upwardly away from the pipe or nut 3, and hence all of the force produced by the screw 73 is spent in drawing and binding the box hole sleeve 11 into close engagement with the box hole H and simultaneously forcing the arms 10—11 to execute a powerful, embracing pressure about the pipe, lifting the pipe and holding it against the pressure of the screw 73. The wire clamp screw 75 connects a ground wire 74 to the box B and this wire is run to and grounded at any suitable place.

It has been shown in Figures 1 through 4, how the grounding device is mounted on the inside of a box, and in Figures 8 and 9 how it is mounted on the outside of a box. In either case, the contact segmental cuff or sleeve ring 11 is embraced within the box hole H. After the operating screw on any form is tightened, the two pipe clamp nuts 2 and 3 are then screwed up to effect final anchorage of all parts.

In Figures 6, 7, 10 and 11, the grounding device may be mounted on the inside or outside of the box, but, ordinarily where a direct or extra ground wire 64, 74 and 21 are employed, it is the usual practice to install the device on the inside of the box, as shown in the several views. The extra ground wire is positively connected by the device to the box and the pipe because of the wedging of the portion 11 into the box hole and the seating of the operating screw against the pipe.

It is clear enough from the foregoing description that the type of electrical ground connecting device or ring as shown in Figure 5 is subject to many forms of construction, but I have offered as an important feature of the invention, means, such as gap 14, in any form of the ring, to enable it to be placed in position without unsoldering and disconnecting the wires W, which reduces the work. This segmental ring construction in effect form a saddle which embraces and straddles the pipe and the operating means 13, 22, 61 or 73 forces the ring portions or segment ends to contract about the pipe.

Since the contact sleeve 11 is confined in the box hole, the flange 10 is prevented from dilation or enlargement when it is forced laterally or transversely to the pipe axis by the operating screw carried on the device, and being thus restrained, the binding action of the out-stretched arms or saddle against the pipe is perfected.

What is of further importance is the fact that, in case the operating screw 13, 22, 61 or 73 is omitted, even through oversight or otherwise, it is seen that the operation of the pipe nuts 2 and 3, effectively wedges and seats the box hole engaging portion 11 which makes contact with the box, and that one of the pipe nuts presses into the thin sheet metal segment or flange 10 which makes contact with the pipe, the box and nut. It is significant that I take advantage of either or both operating means to carry out the purposes of the invention, the screw-threaded nuts 2 and 3 carried on the pipe and acting longtiudinally, as well as the screw 13 carried on the grounding device and acting transversely. This makes for security in installation and eliminates the fire hazard, and the device is simple to install.

The pipe connecting, anchorage, or operating means 2—3 makes bonding, or electrical connection, requisite because by tightening the nuts 2 and 3, it follows that the grounding or bonding device has its box hole edge contacting portion 11 pressed into the box hole edge or rim so that bonding is effected or follows by the mere use and operation of this pipe connecting means 2—3. Indeed, the actuation of the means 2—3 to fasten a pipe in the box automatically establishes a box and pipe ground connection because the wedge-shaped member 11 is driven into seated and scraping engagement with the box hole edge defining the knock-out H and defining a thin annular clearance space between the pipe and box hole edge. Within this thin annular clearance space, the bonding occurs and is requisite, by operation of the means which fastens a conduit to a pipe.

What is claimed is:

1. In combination with a box provided with an opening and a conduit received therein, a grounding device comprising an expansible and contractile member which straddles the conduit, wedge-shaped means carried with the member and projecting into and engaging the box opening, and means mounted on the conduit to anchor the conduit in the opening and to force the member axially of the pipe to bind the wedge-shaped means against the box hole edge and the member against the conduit.

2. In combination with a box provided with an opening and a conduit received thereinto, wires extending through the conduit into the box, a grounding device comprising a ring-like member with a segmental portion cut away to leave a gap to receive the wires into the device, said ring-like member being mounted on and embracing the conduit adjacent the box wall and opening, a wedging sleeve formed on the inner periphery of the member and reaching into and binding against the box hole edge and bearing on the conduit, and screw means carried on the conduit to clamp the member between the box wall and screw means and to force the wedging means and seat the same into and against the box hole edge.

3. In combination with a box having a hole and a pipe received thereinto, with wires extending through the pipe into the box, and at least one nut screwed onto the pipe against the box to anchor the pipe in the box hole; of an electrical ground connecting device comprising a ring-like member mounted on the pipe between the box wall and nut and clamped by the latter, a portion of the ring extending into the box hole to grip the box wall and held therein by the nut, and means included in the structure of the member by which it may be placed on the pipe over the wires without disconnecting the latter.

4. In combination with a box having a hole and pipe received thereinto, wires in the pipe and box, a ring with a segmental portion cut away forming a gap to permit the wires to pass into the ring so the ring may be placed on the pipe adjacent the box wall and hole, an engaging portion carried with the ring and extending into the box hole and bearing against the edge thereof, operating means carried on the ring opposite the gap and reacting from the pipe to make contact therewith and to apply a force thereto transversely to the pipe, and operating means carried on the pipe to longitudinally press and seat the engaging portion in the box hole and to anchor the pipe in the box hole.

5. A box, conduit and grounding assembly comprising, a box provided with an opening, a pipe placed in the opening, a grounding device having box hole gripping means interposed in the clearance space between the pipe and box hole edge, and anchorage means to fasten a pipe in the box hole and including a nut screwed onto the pipe against said grounding device and forcing the box hole gripping means axially into the clearance space and thereby making a bonding action between the box and pipe in the clearance space when the anchorage means is actuated.

6. In a grounding device, a flat thin sheet metal ring-like part stamped from sheet metal and having an opening through which a conduit is passed, and being provided with a restricted opening to pass over an electrical feed wire in the conduit, said restricted opening thus making the device a segment of more than one hundred and eighty degrees and by which it retains its position on a conduit, and a circular wedge-shaped flange means adjacent the opening of the device to be inserted in the box hole and squeeze into electrical engagement with an adjacent part in a box assembly.

7. A box assembly comprising an outlet box having an opening through a wall of the box, a conduit pipe extending through the opening, a ring mounted upon the conduit pipe adjacent the box wall, means upon the ring having an exterior inclined surface with respect to the axis of the ring to engage the box hole edge, at least one conduit pipe anchorage member mounted upon the pipe to anchor the conduit within the opening and to force the ring axially of the pipe to bind the inclined surface against the box hole edge, and means mounted on the ring to forcibly engage the conduit pipe structure.

8. A grounding device comprising a thin flat expansible and contractile ring, means projecting from the side of the ring and having an exterior surface inclined with respect to the axis of the ring, and means to attach a ground wire to the ring.

9. A grounding device comprising a thin flat expansible and contractile ring, means projecting from the ring at the inner periphery thereof and having an outer surface inclined with respect to the axis of the ring, and means to attach a ground wire to the ring.

10. A grounding device comprising a thin flat expansible and contractile ring, means projecting from the ring at the inner periphery thereof and having an outer surface inclined with respect to the axis of the ring, and an ear at the outer periphery of the ring having wire attaching means carried thereby.

11. A grounding device comprising a thin flat expansible and contractile ring, wedge-shaped means projecting substantially at right angles from and at the inner periphery of the ring to engage a box hole edge, and means to attach a ground wire to the ring.

12. A grounding device comprising a thin flat expansible and contractile ring, a circular wedge-shaped flange projecting substantially at right angles from and at the inner periphery of the ring to engage a box hole edge, and means to attach a ground wire to the ring.

13. A grounding device comprising an expansible and contractile ring, means having an external surface inclined with respect to the axis of the ring and projecting substantially at right angles from and at the inner periphery of the ring, and operating means upon the ring having its force directed substantially normal to the axis of the ring.

14. A grounding device comprising an expansible and contractile ring, a circular wedge-shaped flange projecting substantially at right angles from and at the inner periphery of the ring, means to attach a ground wire to the ring, and an operating screw mounted on the ring and directed towards the axis thereof.

15. A grounding device comprising a thin flat segmental ring having a gap in its periphery, means having an inclined outer surface projecting from the side of the ring, and operating means mounted upon the ring opposite the gap and directed towards the axis of the ring.

16. A grounding device adapted to be inserted in an outlet opening in a box wall comprising a single thin flat expansible and contractile ring having a substantial gap therein with the ring exceeding 180° in circumference, a flange extending substantially at right angles from and at the inner periphery of the ring, the flange having a width less than the thickness of the box wall, and operating means upon the ring having its force directed substantially normal to the axis of the ring.

In testimony whereof I affix my signature.
STEPHEN N. BUCHANAN.